United States Patent [19]

Lamlee

[11] 4,135,331
[45] Jan. 23, 1979

[54] SEEDLING SPROUTER

[76] Inventor: Stewart Lamlee, 55 W. 86th St., New York, N.Y. 10024

[21] Appl. No.: 780,080

[22] Filed: Mar. 22, 1977

[51] Int. Cl.² .......................................... A01G 9/02
[52] U.S. Cl. ...................................... 47/61; 206/815; 220/231; 220/301
[58] Field of Search ................... 47/14, 15, 16, 39, 60, 47/61, 62, 63, 64, 69; 222/480; 220/300, 301, 302, 231; 206/815

[56] References Cited

U.S. PATENT DOCUMENTS

| 1,699,765 | 1/1929 | Staples | 206/815 |
|---|---|---|---|
| 1,715,146 | 5/1929 | Pletcher | 220/301 |
| 2,655,283 | 10/1953 | Moldt | 220/22 |
| 2,927,394 | 3/1960 | Johnson | 47/59 |
| 3,140,804 | 7/1964 | Frank | 220/480 |
| 3,211,320 | 10/1965 | Peters | 220/301 |
| 3,314,194 | 4/1967 | Halleck | 47/69 |
| 3,486,665 | 12/1969 | Croce | 222/480 |
| 3,704,545 | 12/1972 | Van Reisen | 47/69 |
| 3,848,358 | 11/1974 | Messmer | 47/69 |
| 3,903,642 | 9/1975 | Yellin | 47/69 |

FOREIGN PATENT DOCUMENTS

| 829094 | 6/1938 | France | 47/14 |
|---|---|---|---|
| 1215951 | 4/1960 | France | 47/29 |
| 21935 | 7/1900 | Switzerland | 220/301 |
| 20825 of | 1892 | United Kingdom | 47/16 |
| 1274416 | 5/1972 | United Kingdom | 47/14 |
| 1406708 | 9/1975 | United Kingdom | 47/14 |

*Primary Examiner*—Edgar S. Burr
*Assistant Examiner*—James R. Feyrer
*Attorney, Agent, or Firm*—Brian L. Ribando

[57] ABSTRACT

A seedling sprouter comprises a base which supports a screen therein and a complimentary cover. The cover and base lock together by means which allow the cover to be spaced from the base when the sprouter is being drained. A closure on the cover is rotatable to three positions in which water may be added to the sprouter, water may be drained from the sprouter without the loss of the sprouted seeds therein, or the sprouter may be sealed.

5 Claims, 7 Drawing Figures

FIG. 1.
FIG. 2.
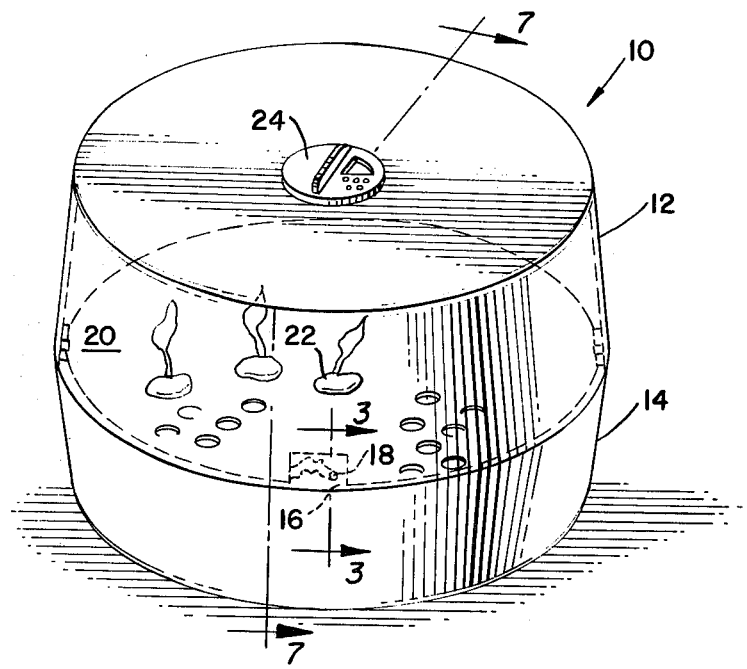
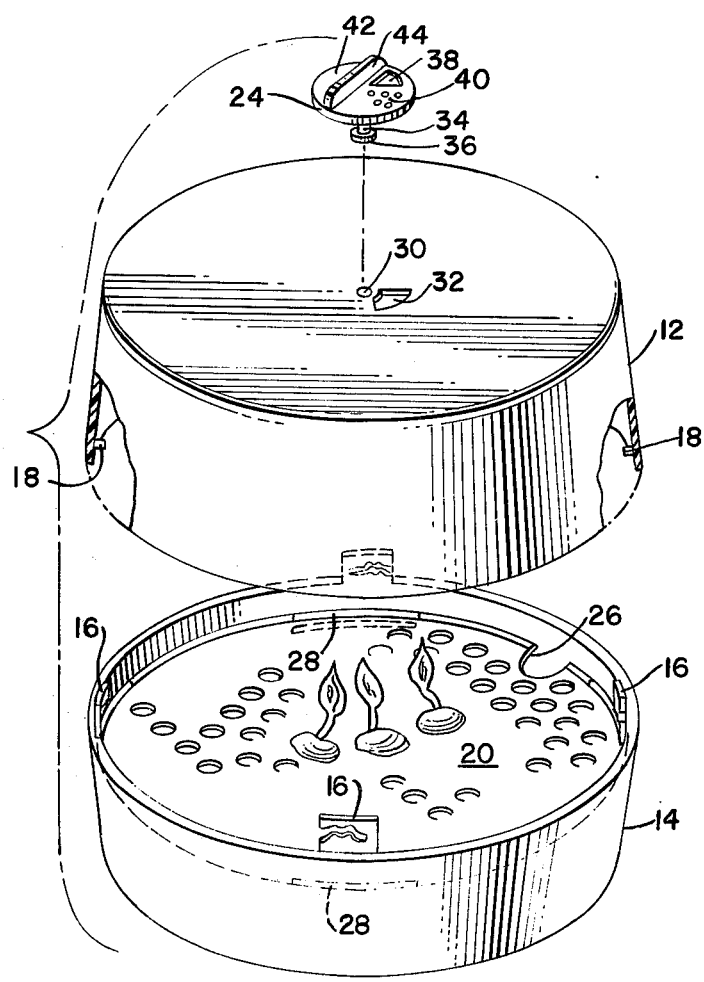

SEEDLING SPROUTER

BACKGROUND OF THE INVENTION

A sprouter for seeds is a kitchen device which has gained great popularity in recent years. Sprouted seeds are recognized as having high nutritional value and are a tasty addition to many types of meals. The seeds themselves can be inexpensively obtained and easily stored. Until the present time, a satisfactory sprouter has not been known. The patent to Eden, U.S. Pat. No. 3,606,697, discloses a tray for seed germination which includes a bottom portion, a cover, and an integral heating element. The Eden device is not particularly well adapted for kitchen use, however, and cannot be easily cleaned.

The sprouter of the instant invention comprises a clear plastic base which supports a plastic screen therein and a clear plastic cover. The cover includes pegs which mate and lock with plates attached to the base for securing the cover in a closed position, in a venting position, or for releasing the cover. The cover top is provided with a rotatable closure which may be turned to one of three positions. In a first position, water may be added to the interior of the sprouter, and in a second position, water may be drained from the sprouter without the loss of the sprouted seeds therein. In a third position, the venting and draining aperture in the cover is closed. Seeds are supported on the screen during the sprouting process, and the screen is removable to allow a thorough cleaning of the lower interior portion of the base. These and other features of the invention will be apparent from a reading of the detailed description taken in conjunction with the drawings.

BRIEF DESCRIPTION OF THE DRAWINGS

FIG. 1 is a perspective view of the invention with the cover locked into place on the base.

FIG. 2 is an exploded view of the sprouter with the cover removed from the base and the rotatable cover removed from the cover.

DESCRIPTION OF THE PREFERRED EMBODIMENT

Figure 3:
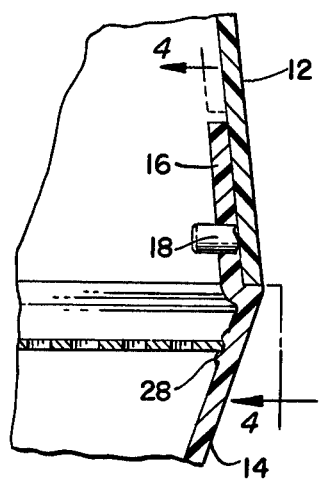
FIG. 3 is a sectional view of the base and cover lock taken along lines 3—3 of FIG. 1.
Figure 4:
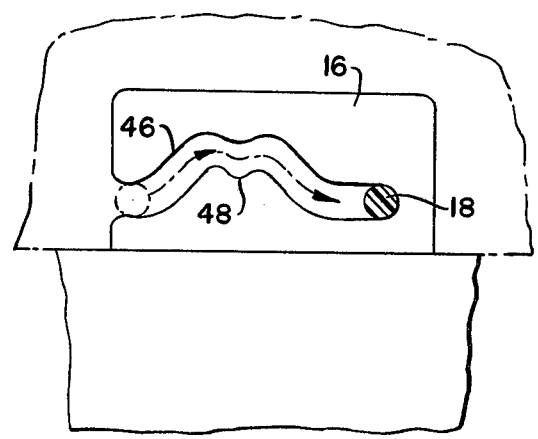
FIG. 4 is a sectional view taken along lines 4—4 of FIG. 3.
Figure 5:
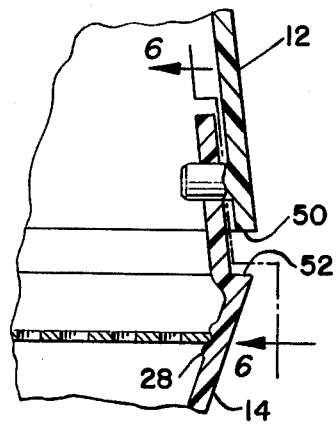
FIG. 5 is a detail view of the base and cover lock in a vented position.
Figure 6:
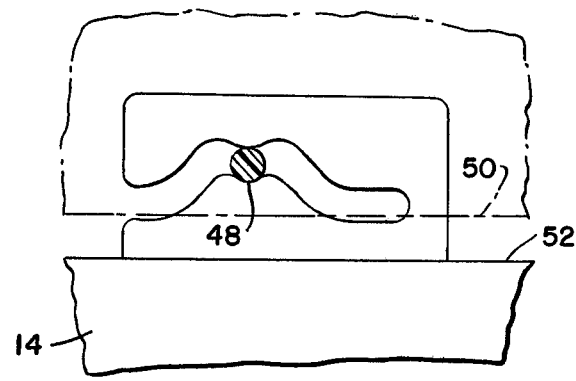
FIG. 6 is a sectional view taken along line 6—6 of FIG. 5.

Shown at FIG. 1 is a seedling sprouter 10 comprising a base 14 and a cover 12. Attached to the base 14 are a plurality of locking plates, one of which is shown in phantom at 16, which receive locking pegs, shown in phantom at 18, attached to the cover 14. These locking means will be described in greater detail below. The interior of the base is provided with a screen 20 which is adapted to support sprouted seeds 22. The cover includes a rotatable closure 24 which may be set to one of three positions as desired.

Turning now to FIG. 2, it will be seen that four locking plates 16 are provided on the base 14. The Figure shows two of the locking pegs 18 extending inward from the lower edge of the cover 12. Of course, there is one locking peg provided for each of the locking plates, and the number of locking plates and pegs may be varied as desired without departing from the spirit of the invention. The screen 20 includes a finger opening 26 which allows the screen to be removed from the base 14 for cleaning. The screen is normally held in place within the base 14 by a plurality of raised ribs 28 spaced around the interior wall of the base. The ribs and the screen are dimensioned such that downward pressure on the screen 20 will cause it to snap past the ribs 28 and be captured between the ribs and the sloping wall of the base. In this position, the base can be turned upside-down and the screen will remain in place. With the aid of the finger opening 26, the screen can be pulled free from the ribs 28 and both the screen and interior of the base can be thoroughly cleaned.

The rotatable closure 24 is shown spaced from the cover 12 and in this position it can be seen that the cover 12 includes a pivot aperture 30 and an arcuate access aperture 32. During assembly of the cover and the closure, the pivot aperture 30 receives the stem 34 of the closure and a heated tool is used to form the flair end 36 on the stem 34 to retain the closure in place on the cover. The closure includes an arcuate aperture 38 and a perforate section 40. A solid portion 42 is effective to close the aperture 32 and a raised rib 44 allows the closure to be easily rotated.

Turning now to FIGS. 3, 4, 5, and 6, the structure and cooperation of the locking plates 16 and the locking pegs 18 can be fully explained. It will be seen that each plate 16 is formed with a tortuous slot 46 therein which is dimensioned for a close fit with a peg 18. In the position shown at FIG. 4, the peg 18 is at the distal end of the slot and the lower edge of the cover 12 is in contact with the upper rim of the base 14. In the positions shown at FIGS. 5 and 6, the peg rests in the dimple 48 of the slot 46. This dimple allows the lower edge 50 of the cover to be spaced from the rim 52 of the base in a stable orientation.

Figure 7:
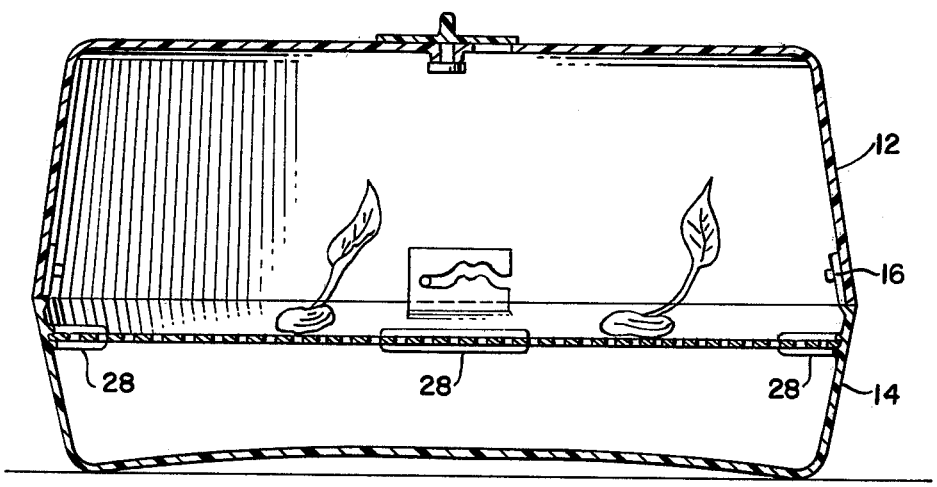
FIG. 7 is a sectional view of the sprouter taken along line 7—7 of FIG. 1.

Turning now to FIG. 7, it can be seen that the construction of the device provides for a neat and trim appearance. The placement of the locking plates 16 allows the sides of the cover 12 to be flush with the sides of the base 14 along the line of their junction. As shown, the bottom surface of the base 14 is domed slightly inward. The manner of use of the device is relatively straightforward. With the screen 20 snapped into position, seeds can be placed thereon and water added. Excess water will filter through the seeds and screen and collect in the bottom of the base 14. The cover 12 can then be put onto the base 14 and rotated to lock the pegs 18 into the plates 16. The closure 24 can be rotated so that the solid portion 42 thereof closes the aperture 32. Because the unit is sealed, the water in the base 14 will saturate the air therein with water vapor and this moisture will cause the seeds to sprout. In the event that more water is needed or it is desired to add seed to the screen, the closure 24 can be rotated to allow access to the aperture 32 through the aperture 38. It will be appreciated that this small access opening allows an addition of water or seeds to the device without destroying the environment therein as by complete removal of the cover. If it is desired to drain the sprouter, the closure 24 can be rotated so that the perforate section 40 overlies the aperture 40 and the cover 12 can be rotated so that the locking pegs 18 rest in the dimple 48. The entire sprouter can then be inverted and the water will pass through the perforate section 40 while the sprouted seeds are retained within. The spacing of the cover and the base allowed by the dimples in the locking plates provides a vent for air entering the sprouter to replace the volume of water being drained therefrom. Without this venting effect, the sprouter interior becomes vacuum locked after a small amount of water has drained therefrom preventing the draining of the remaining water.

Having thus described the invention, modifications and alterations thereof will occur to those skilled in the art, which modifications and alterations are intended to be within the scope of the invention as defined in the appended claims.

I claim:

1. A sprouter for seeds comprising a first member having a first generally circular enclosing side and a bottom portion, a second member having a second generally circular enclosing side and a top portion, the perimeter of said first enclosing side being approximately equal to the perimeter of said second enclosing side, a screen located within said first member, means for spacing said screen from said bottom portion, closure means mounted on said second member, and locking means for locking said first and second members to one another, the locking means including means for spacing said first member from said second member in a stable position and for creating an annular air gap therebetween allowing communication between the interior of the sprouter and the exterior thereof, and means for securing said first member to said second member in a mutually contacting relationship to close said annular air gap, said locking means comprising a plurality of plates attached to said first enclosing side and a plurality of pegs attached to said second enclosing side, said plates each having a tortuous slot therein dimensioned to receive one of said pegs, said slot including an entrance portion, a dimple portion, and an end portion, wherein the circular periphery of said first enclosing side is in contact with the circular periphery of said second enclosing side when said peg is in said entrance portion or said end portion, and wherein said two circular peripheries are spaced one from the other when said peg is in said dimple portion.

2. The sprouter of claim 1 wherein said closure means comprises an imperforate section, a perforate section, and an apertured section, said top portion includes an aperture, and said closure means overlies said aperture.

3. The sprouter of claim 2 wherein said spacing means for said screen comprises a plurality of ribs spaced around the inner surface of said first enclosing side wherein said screen is captured between said ribs and the inner surface of said first enclosing side and said ribs.

4. The sprouter of claim 1 wherein an aperture is formed in the top portion of said second member, said closure means comprises an apertured section and an imperforate section, and a portion of said closure member overlies said aperture.

5. The sprouter of claim 4 wherein approximately half of said apertured section comprises apertures dimensioned to block passage of seeds therethrough and the remainder of said apertured section is dimensioned to pass seeds therethrough, and means are provided for selectively positioning a portion of said closure means over said aperture in said top.

* * * * *